(12) United States Patent
Husemann et al.

(10) Patent No.: US 6,192,349 B1
(45) Date of Patent: Feb. 20, 2001

(54) SMART CARD MECHANISM AND METHOD FOR OBTAINING ELECTRONIC TICKETS FOR GOODS SERVICES OVER AN OPEN COMMUNICATIONS LINK

(75) Inventors: Dirk Husemann, Adliswil (CH); Matthias Kaiserwerth, Ridgefield, CT (US)

(73) Assignee: International Business Machines Corporation, Armonk, NY (US)

( * ) Notice: Under 35 U.S.C. 154(b), the term of this patent shall be extended for 0 days.

(21) Appl. No.: 09/162,015

(22) Filed: Sep. 28, 1998

(51) Int. Cl.⁷ ...................................... G06F 17/60
(52) U.S. Cl. .................. 705/65; 705/41; 705/67; 705/75
(58) Field of Search ................ 705/26, 21, 64–78, 705/41; 380/21, 24, 25

(56) References Cited

U.S. PATENT DOCUMENTS

| 4,935,962 | * | 6/1990 | Austin | 380/25 |
| 5,309,355 | | 5/1994 | Lockwood | 364/401 |
| 5,491,749 | * | 2/1996 | Rogaway | 380/21 |
| 5,754,654 | * | 5/1998 | Hiroya et al. | 380/24 |
| 5,778,071 | * | 7/1998 | Caputo et al. | 380/25 |
| 5,781,723 | * | 7/1998 | Yee et al. | 713/200 |
| 5,850,442 | * | 12/1998 | Muftic | 380/21 |

FOREIGN PATENT DOCUMENTS

0823694A1 * 8/1996 (EP) .

OTHER PUBLICATIONS

Schneier, Bruce, Applied Cryptography, John Wiley & Sons, Inc., pp. 417–425, 1994.*
Rankl W. & Effin W. Smart Card Handbook. New York: John Wiley & Sons 1997 pp. 82–84, 185 and 257.*
Schneier, Bruce Applied Cryptography Second Edition New York: John Wiley & Sons 1996, p. 458.*

* cited by examiner

Primary Examiner—Eric W. Stamber
Assistant Examiner—Susanna Meinecke-Diaz
(74) Attorney, Agent, or Firm—James E. Murray

(57) ABSTRACT

A smart card, (a type of credit card containing storage capacity and processing ability preferably in the form of a microprocessor), is used to store an electronic ticket provided from the service provider's computer system to the customer's computer over an insecure communications line. Upon the request for a ticket from the customer's computer, the service provider's system transmits a ticket loading request token $T_{LR}$ to the customer's computer to be loaded into a smart card of the customer. The smart card responds to the ticket loading request token $T_{LR}$ by producing a ticket loading token $T_L$ containing a hash of the ticket loading request token $T_{LR}$; the smart card's identifier $T_{ID}$; a secret number $G_C$ and ticket loading token $T_{L'}$ from the previous transaction of the smart card. The hash signal is attached to the ticket loading token $T_L'$ from the previous transaction and shipped back to the ticket provider. The ticket provider's system then creates the electronic ticket containing the ticket information and a new hash or signature $T_S$ number, formed by hashing the ticket information with the hash number received from the customer, and returns it to the customer's computer. The smart card checks the signature $T_S$ of the ticket and if it matches its own calculation of $T_S$, accepts and stores the ticket. Once the ticket is entered, the smart card changes $T_L'$ to $T_L$ in preparation for the next transaction.

16 Claims, 5 Drawing Sheets

SMART CARD MECHANISM AND METHOD FOR OBTAINING ELECTRONIC TICKETS FOR GOODS SERVICES OVER AN OPEN COMMUNICATIONS LINK

FIELD OF THE INVENTION

The present invention relates to performing secure transactions over an open communications link, such as internet connection, and more particularly, to the dispensing of electronic tickets or vouchers in performing such transactions.

BACKGROUND OF THE INVENTION

Electronic tickets, which can be used to obtain information, goods and services, can be dispensed over an internet connection. The most obvious example of a transaction using an electronic ticket would be the purchase of a train or airplane ticket. However, electronic tickets could also be used as vouchers for obtaining other goods or services. A transaction using a communications hookup not under control of the goods or service provider subjects the provider and his customer to a number of risks. The primary risk of providing a ticket on the internet would be the diverting of the ticket by a third party observing the transaction on the open connection. However, other risks exist for both the ticket provider and his customer.

Therefore, it is an object of the present invention to provide secure commercial transactions over a public communication network.

It is another object of the present invention to provide a method and apparatus for preventing stealing or fraud in connection with commercial transactions over the internet.

BRIEF DESCRIPTION OF THE INVENTION

In accordance with the present invention, a smart card, (a type of credit card containing storage capacity and processing ability preferably in the form of a microprocessor), is used to store an electronic ticket provided from the service provider's computer system to the customer's computer over an insecure communications line. Upon the request for a ticket from the customer's computer, the service provider's system transmits a ticket loading request token $T_{LR}$ to the customer's computer to be loaded into a smart card of the customer. The smart card responds to the ticket loading request token $T_{LR}$ by producing a ticket loading token $T_L$ containing a hash of the ticket loading request token $T_{LR}$; the smart card's identifier $T_{ID}$; a secret number $G_C$ and the ticket loading token $T_L'$ from the previous transaction of the smart card. The hash signal is attached to the ticket loading token $T_L'$ from the previous transaction and shipped back through the customer's computer to the ticket provider's system. The ticket provider's system then creates the electronic ticket containing the ticket information and a new hash or signature $T_S$ number, formed by hashing the ticket information with the hash number received from the customer, and returns it to the customer's smart card. The smart card checks the signature $T_S$ of the ticket and if it matches its own calculation of $T_S$, accepts and stores the ticket. Once the ticket is accepted, the smart card changes $T_L'$ to $T_L$ in preparation for the next transaction.

The above arrangement provides significant security from diversion and fraud. Third parties on the unsecured line cannot divert the electronic ticket unless they know the card's secret number. The customer cannot modify or duplicate the hash in the ticket information without knowing the secret number $G_C$ and cannot be obtained by interrogating of the smart card. Further, once the ticket is entered and $T_L'$ changed to $T_L$, the smart card will not accept another copy of the same ticket since its calculation of $T_S$, will no longer match the signature $T_S$ of the ticket.

BRIEF DESCRIPTION OF THE DRAWINGS

The invention can be better understood by reading the accompanying detailed description of an embodiment thereof while referring to the accompanying figures of which.

DETAILED DESCRIPTION

Figure 1:
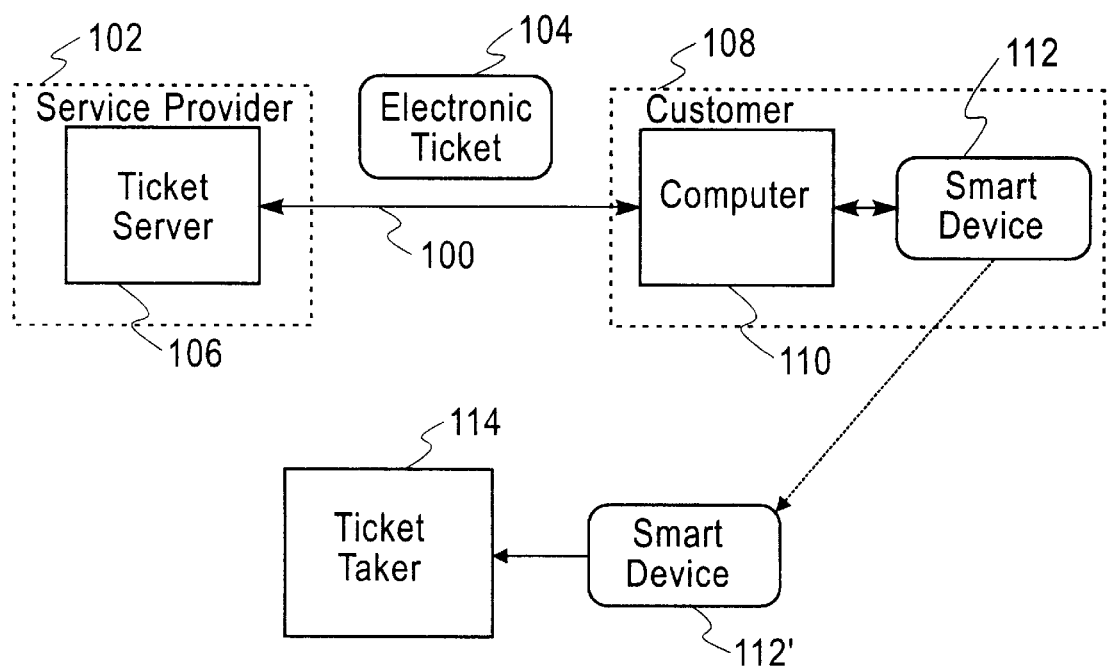
FIG. 1 is a schematic of a ticket transaction.

As shown in FIG. 1, in response to a request made by a customer 108 on an internet connection 100, a ticket provider 102 transmits an electronic ticket 104 from its ticket server 106 back on the internet connection 100 to the customer 108 who made the request. The ticket is loaded by the customer's computer 110 into a smart card 112. To obtain entry to the contracted ride or performance, the smart card 112 is taken to a ticket taker 114 which can check the validity of the ticket without referencing the central database and, if valid, admit the smart card holder to the ride or performance.

Figure 2:
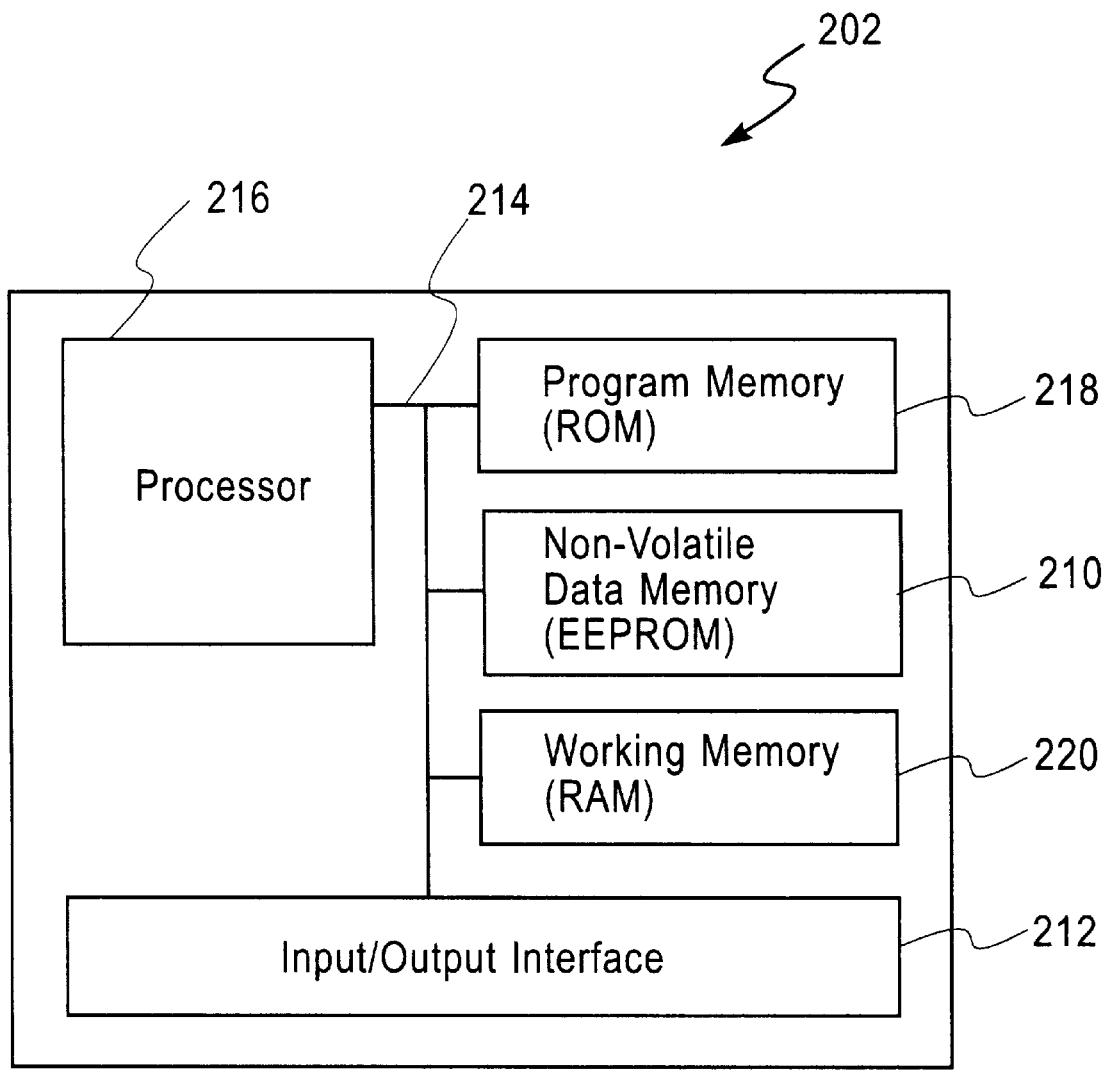
FIG. 2 is a schematic of a smart card processor.

As shown in FIG. 2, ticket data are stored in a non-volatile EEPROM 210 of a smart card through the input/output interface 212, and data bus 214 of the card. The smart card 202 includes a microprocessor 216 and a random access memory 220 for performing functions associated with the ticket process, and a read only memory 218 containing the microprocessor's operating system, and software and data that enables the ticket process of the present invention. The data stored in the read only memory includes:

i) a public identification for the card $T^{pub}_{ID}$;

ii) a private identification for the card $T^{priv}_{ID}$ which is not known to the ticket provider;

iii) a secret key $G_C$, for each card which can be calculated from a secret master key G (known to the ticket provider and taker) by performance of a hash over the concatenation of the master key G and the cards public ID, $T^{pub}_{ID}$ or:

$$G_C = H(G \| T^{pub}_{ID}) \qquad (a$$

where:

H( ) indicates the hashing function and

∥ indicates the concatenation; and iv) a starting condition $$T_L'' = H(\text{init} \| G_C) \qquad (b$$

where: "init" is a random nonce chosen by the ticket provider either as a general default for all cards or different ones for different cards.

Figure 3:
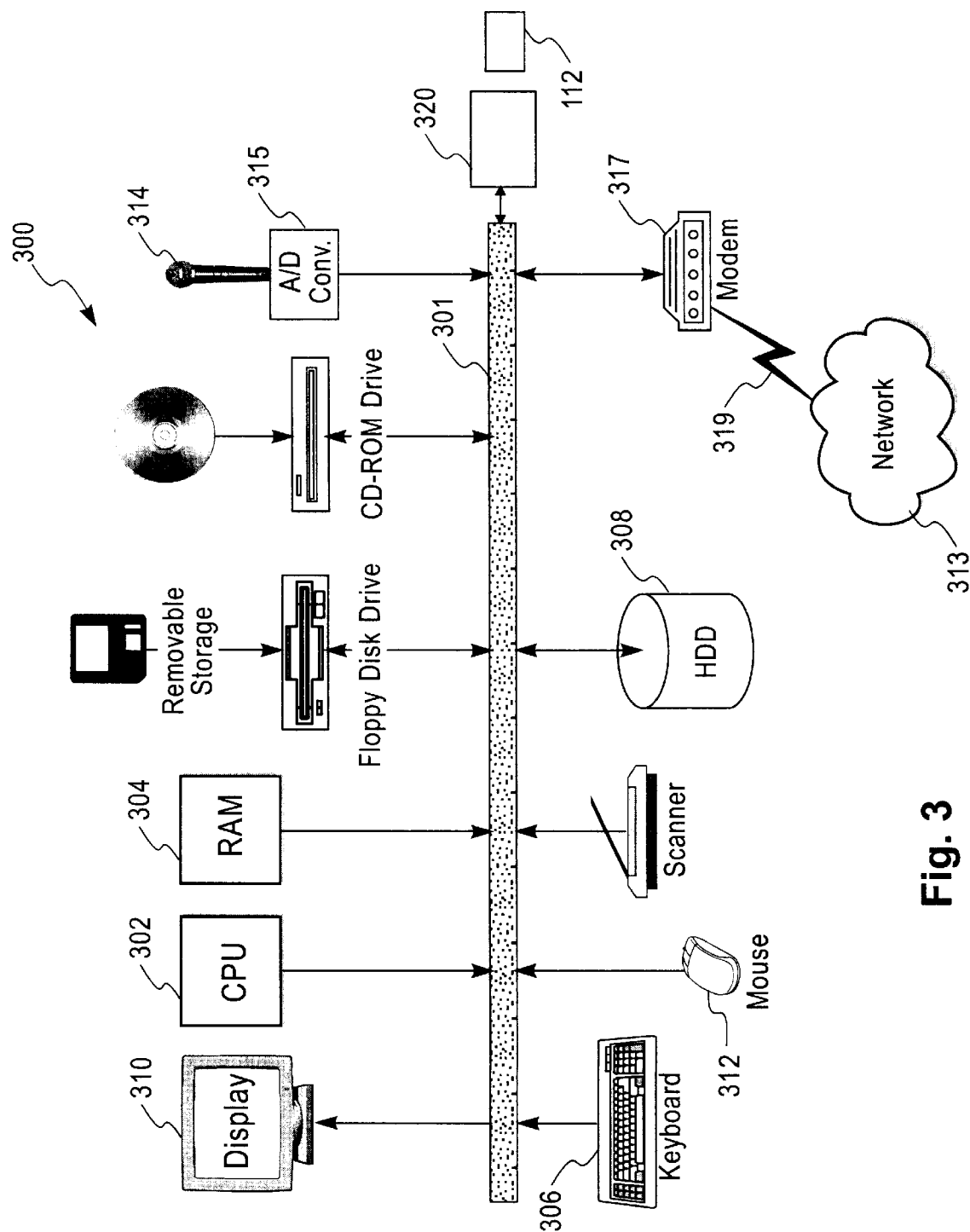
FIG. 3 is a schematic of a general purpose computer.

The ticket server 106, the ticket taker 114 and the customer's computer 110 can each be any properly configured general purpose computer system, such as the one shown in FIG. 3. Such a computer system 300 includes a processing unit (CPU) 302 connected by a bus 301 to a random access memory 304, a high density storage device 308, a keyboard 306, a display 310 and a mouse 312. An example of such a computer is an IBM Personal Computer of the International Business Machines Corporation, such as an Aptiva E2N Model with an AMD-K6-2/266 processor operating under Microsoft Windows 98 operating system of the Microsoft Corporation.

The computers also include a card reader 320 into which the smart card is inserted for extracting information from and providing information to the smart card 112. Also, software is stored in the high density storage device 310 to perform the transactions and computations of the present invention in accordance with the function of the particular computer. To transmit and receive information on the network 313, a modem 317 is provided to connect the computer 300 to the network 313 through a standard telephone connection 319. Also provided, is an internet browser capable of running Java, software of Sun Microsystems. Examples of such browsers are Netscape Navigator, by Netscape Communications Corporation, and Internet Explorer, by Microsoft Corporation.

Figure 4:
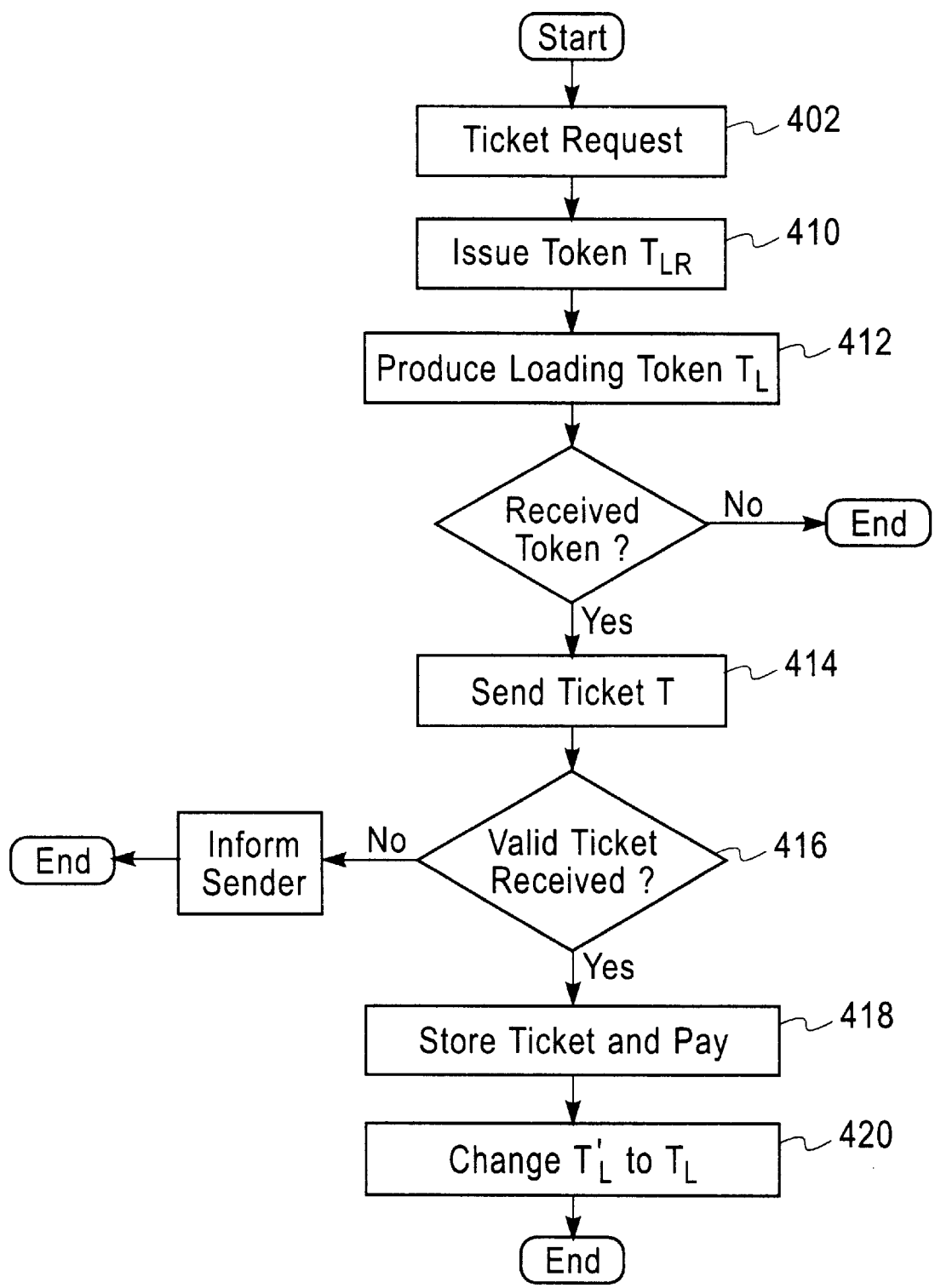
FIG. 4 is a flow diagram of the ticket supplying process.

Referring to FIG. 4, when a customer inserts a smart card into the reader, dials up the ticket provider on the internet and requests a ticket, the service provider sends a ticket loading request token $T_{LR}$ to the smart device 410. The loading request token $T_{LR}$ is associated by the ticket provider with the particulars of the ticket (destination, time, seat, etc.).

The software of the smart device responds to the ticket loading request token by sending the ticket provider a ticket loading token $T_L$. The ticket loading token $T_L$ includes a hash of a data string formed by concatenating the received ticket loading request token $T_{LR}$, the private identifier $T^{priv}_{ID}$ for the smart card, the secret $G_C$ and the ticket loading token $T_L'$ from the previous transaction of the card. (If the card has not been used, the stored initial value $T_L''$ of (b is used in place of $T_L'$.) The above hash is attached to the loading token $T_L'$ of the previous transaction which is transmitted in the clear or;

$$T_L = T_L' \| H(T_L' \| T_{LR} \| T^{priv}_{ID} \| G_C) \tag{c}$$

In addition, the smart card sends the ticket provider an identification token $T^C_{ID}$ containing the cards public ID, $T^{pub}_{ID}$, transmitted in the clear concatenated to a hash of $T^{pub}_{ID} \| T_{LR} \| G_C$ or:

$$T^C_{ID} = T^{pub}_{ID} \| H(T^{pub}_{ID} \| T_{LR} \| G_C). \tag{d}$$

The public ID is needed for the ticket provider to calculate the cards secret $G_C$ with (a.

Upon receipt of the ticket loading token $T_L$, and the identification token $T^C_{ID}$, the service provider creates a signature $T_S$ of a hash over the ticket text, the ticket loading token $T_L$, and the cards secret $G_C$:

$$T_S = H(text \| T_L \| G_C). \tag{e}$$

The ticket sender then issues the ticket T, which includes the ticket text in the clear attached to a hash of the signature $T_S$ computed in (e or:

$$T = Text \| T_S. \tag{f}$$

The ticket sender also stores the ticket record:

$$R_T = T_L, T_{LR}, text. \tag{g}$$

The smart device verifies the downloaded ticket by calculating the signature itself as $T_S'$ 416. If $T_S'$ matches $T_S$, the smart device will accept the ticket T. Finally after accepting the ticket, the smart device changes $T_L'$ to $T_L$ for the next transaction 420 so that the card cannot accept another copy of the same ticket (since $T_S'$ calculated with $T_L$ will not match the $T_S$ for the duplicated ticket). The smart card also stores the ticket tuple (text, $T_0 T_{LR}$) and thus, has sufficient information for the ticket provider to prove, at a later point in time, that the ticket downloading did take place.

Figure 5:
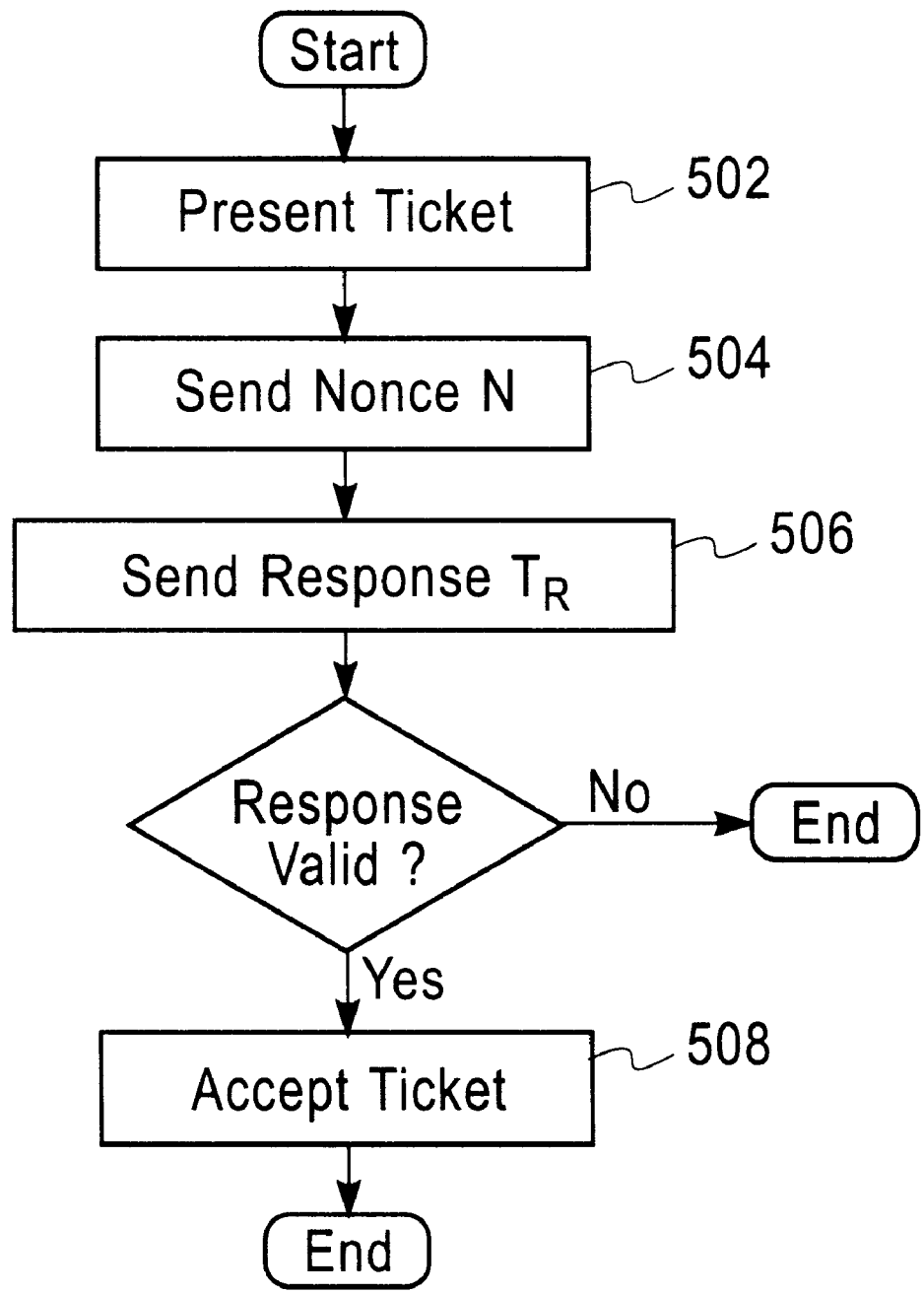
FIG. 5 is a flow diagram of the ticket cashing process.

To check the ticket, the ticket provider or a ticket taker can ask the smart device to display the ticket. As shown in FIG. 5, the customer places the ticket into the card reader of the ticket provider's or ticket takers machine 502. The ticket provider or the ticket taker then sends a random nonce N to the smart device 504. The smart card sends back two tokens:

The first token is an identification token $T^{C'}_{ID}$ which is the public ID of the card concatenated with the hash over that public ID and the nonce N and the card secret $G_C$ or:

$$T^{C'}_{ID} = T^{PUB}_{ID} \| H(T^{PUB}_{ID} \| N \| G_C) \tag{h}$$

Using (h the ticket collector obtains the public ID of the smart card (and can verify if as the smart card has to send back the "signed" nonce).

The second token is the signed ticket token which is the text concatenated with the hash over the nonce, the text and the card's secret $G_C$, concatenated with the hash over $T_L'$ and the card's secret $G_C$ ("fingerprinted Sig T") or:

$$T_R = text \| H(text \| N \| G_C) \| H(text \| T_L' \| G_C). \tag{i}$$

With $T^{pub}_{ID}$ from (d and the secret master key G the ticket taker can check if $G_C$ provided in (g is correct and provide entry to the ride or event if it is. In addition, with the stored text $R_T$ of (g, the ticket provider's system can calculate $T_S'$ using (e.

In the embodiment described, to assure secrecy the tokens $T_{LR}$, $T_L$, $T_S$, etc., the secret $G_C$ and the ticket text consist of large strings of numbers and/or characters. For the message authentication hash H( ) a keyed-hashing algorithm and a suitable hash function (e.g., MD-5) is used such as the HMAC algorithm described in RFC 2104, where the secret keys G and $G_C$ (of the smart device) are used in place of HMAC's secret key K. For the computation of the shared derived secret $G_C$ the unique public identification $T_{ID}$ of the smart device and the master key G are used as key K.

The following observations and remarks are made about the above described procedure:

1. A ticket on the service provider's side comprises some ticket text and a ticket identification: (text, $T_{LR}$).
2. Creation of ticket loading token $T_L$, and the electronic ticket T require knowledge of the cards secret $G_C$ (unless the shared secret $G_C$ or the global secret G is compromised neither can be created by the customer or other party).
3. The private identity $T^{priv}_{ID}$ of the smart device is not known to the service provider—only in case of dispute will the customer have to reveal $T^{priv}_{ID}$ to the service provider.
4. Creation of both the ticket loading token $T_L$ and the signature $T_S$ require the cooperation of the smart device since only the smart card knows its secret $G_C$.
5. By changing $T_L'$ to $T_L$ after the smart card received the ticket T means the smart card will accept the ticket T containing $T_L'$ just once.
6. The smart device retains a copy of $T_S$ of the electronic ticket T in $T_L'$.

The following is a discussion of how the present invention overcomes various attacks that can be made on an electronic ticket.

A. Replay attack: By watching the network connection the customer extracts a copy of the electronic ticket, stores it on her or his machine, and—after having consumed the service granted by the ticket—replays it using the smart device.

If the customer has stored a second copy T' of the ticket T in his computer and tries to download the copy T into the smart device, the smart device will ignore the copy T', because it changed $T_L'$ to $T_L$ after accepting the original ticket T and, thus, its calculation of the signature $T_S'$ will result in a value different from the signature $T_S$ contained in the second copy T'.

B. Repudiation: Although the customer received the ticket to her smart device and consumed the service, she claims that she never really did receive the ticket (e.g., claiming transfer errors). Alternatively, the customer might claim that the ticket was never ordered.

In this case, the service provider requests a ticket display from the smart device by sending a random nonce N. The response from the smart device contains the ticket text concatenated with the hash over the ticket text, the nonce N and the card's secret $G_C$, concatenated with the hash over $T_L'$ and the card's secret $G_C$. Also, the ticket provider asks the customer to consent to having the smart device reveal its secret private identification $T^{PRIV}_{ID}$. The ticket provider and the ticket taker asks the customer to reveal the secret ID $T^{priv}_{ID}$ of the card.

Using the signed ticket text and N, the ticket provider verifies that the response came indeed from a genuine smart device.

Using the received public identification of the smart device, the ticket provider calculates $G_C$ and then the hash $H(T_S \| G_C)$ himself and compares it to the fingerprinted $T_S$ that he received from the smart device as the result of the ticket display process; furthermore, the ticket provider verifies the ticket loading ticket $T_L$ using the revealed private identification of the smart device—if both hashes match and the ticket loading token verifies, the customer was trying to cheat.

The customer cannot deny having ordered and having received the ticket: Both the fingerprinted $T_S$ and the fingerprinted hash in $T_L$ can only originate with her smart device.

C. Diversion: An attacker steals the ticket by diverting it from the intended smart device to his own smart device.

Like in A, the attacker will not be able to download the ticket because of the signature $T_S$ contained in the ticket T was generated by the customer's smart device (and depends on its $T_L'$ value).

D. Alteration: The customer intercepts the ticket and alters it so that the ticket entitles him to some other service.

If the customer alters the content of the ticket T, the smart device will refuse to load the ticket, as its recalculation of T will then not match the Signature $T_S$ since the customer does not know the secret $G_C$ and thus cannot recalculate Signature $T_S$.

E. Ticket faking: An attacker tries to fake a ticket when a ticket provider or taker asks her to display the ticket.

If the attacker has somehow fabricated a smart device that is under her control and pretends a service provider issued a smart device, the attacker might then try to display an old ticket to the service provider. The service provider sends a ticket display request with a randomly chosen nonce N, to the smart device. This nonce N must be included in the response from the smart device to the service provider. To produce the response, the fake device must know the shared secret associated with the old ticket. Again, as only the real smart device and at this point, the ticket provider and taker know the shared secret $G_C$, only a genuine smart device can produce the correct hash.

Above we have described one embodiment of the present invention. A number of modifications and improvements may be made in this embodiment by those skilled in the art. Therefore, it should be understood that the scope of the invention is not limited to this described embodiment but encompasses the scope and spirit of the appended claims.

We claim:

1. A method for providing information, goods or services by transmitting an electronic ticket for the information, goods services from a ticket provider to a customer over a public communication interconnection comprising:

a) transmitting a ticket loading request token from the ticket provider to a smart card of the customer over the interconnection upon the request of the customer;

b) generating a loading token in the smart card containing a hash of the ticket loading request token, a previous loading token, and a secret key stored in the smart card and providing the ticket loading token back to the ticket provider;

c) transmitting the ticket, containing ticket information and a hash of the ticket loading token from the ticket provider back to the smart card for use of the smart card and the ticket stored therein for obtaining the information, goods or services; and d) changing the Previous loading token to the present loading token once the ticket is loaded into the smart card.

2. The method of claim 1 wherein the secret key is known by the ticket provider but not the customer.

3. The method of claim 1 wherein the secret key can be calculated by the ticket provider from a secret master key and the identity of the smart card.

4. The method of claim 3 including providing the ticket to the ticket taker for verification of the electronic ticket when it is offered by the customer.

5. The method of claim 4 including storing a hashing function, the card identification, and the secret key in the smart card.

6. The method of claim 4 including concatenating the ticket information with the first hashed signal prior to generating the second hash by the ticket provider.

7. A smart card for obtaining an electronic ticket for goods or services from a ticket provider on an open communications connection comprising:

processing logic including a hashing function based coding mechanism to generate a ticket loading token containing a secret key coded in a codeword for transmission to the ticket provider;

a storage facility for storage of the electronic ticket containing coded information sent by the ticket provider in response to the ticket loading token;

data stored in the storage facility including:

i) a public identification $T^{pub}_{ID}$ for the card;

ii) a private identification for the card $T^{priv}_{ID}$ which is not known to the ticket provider; and iii) the secret key $G_C$ for the card which can be calculated from a secret master key G (known to the ticket provider but not to the customer) by performance of a hash over the concatenation of the master key G and the cards public ID, $T^{pub}_{ID}$ or:

$$G_C = H(G \| T^{pub}_{ID})$$

where:

H( ) indicates the hashing function and

∥ indicates the concatenation; and dispensing logic for providing the electronic ticket to a ticket taker to obtain the goods or services.

8. The smart card of claim 7 wherein the goods or services is a ticket for transportation.

9. A ticket dispenser for use with a smart card to provide a ticket for goods or services to a customer over an open communication connection comprising:

a token provider for providing a token identifying the goods or services to the smart card held by the customer in response to a request from the customer for the goods or services;

a ticket provider for providing a ticket with coded information in response to coded information from the smart card identifying the token and the smart card and containing a codeword not known to a smart card holder, which coded information is a hashed resultant of an information string formed by concatenating the token to a card identifier and the codeword; and a storage facility for storing the coded information received from the smart card.

10. Apparatus for a ticket provider to transmit an electronic ticket to a customer over a public communication interconnection for the customer to obtain information, goods or services comprising:

a) means for transmitting a token $T_{LR}$ from the ticket provider to a smart card of the customer over the interconnection upon the request of the customer; and b) means responsive to a ticket loading token $T_L$ from the customer containing a hash of token $T_{LR}$ and the identity $T_{id}$ of the smart card and a secret number to transmit the ticket, said ticket containing ticket information and a hash containing $T_L$ and a secret character string $G_C$ from the ticket provider back to the smart card for use of the smart card with the ticket stored therein to obtain the information, goods or services.

11. The apparatus of claim 10 including the ticket information in a signal $T_S$.

12. The smart card of claim 7 including data for a starting condition $$T_L'' = H(init \| G_C)$$

where: "init" is a random nonce chosen by the ticket provider as a default for the card.

13. A method for providing an electronic ticket from a ticket provider to a customer over a public communication interconnection comprising:

a) transmitting a ticket loading request token $T_{LR}$ identifying ticket particulars from the ticket provider to a smart card of the customer over the interconnection upon the request of the customer;

b) generating a loading token $T_L$ in the smart card containing a hash of the ticket loading request token $T_{LR}$ and a secret key $G_C$ not known by the customer but stored in the smart card and providing the ticket loading token back to the ticket provider along with an identification token $T_C$ for calculation of $G_C$ using a secret master key G known to the ticket provider but not the customer; and c) transmitting the ticket, containing ticket information and a hash of the ticket loading token and the secret character string $G_C$ from the ticket provider back to the smart card for storing in the smart card.

14. The method of claim 13 including providing the electronic ticket to a ticket taker for verification of the electronic ticket when it is offered by the customer.

15. The method of claim 14 including placing a previous ticket loading token in a present ticket loading token and then changing it to the present ticket loading function once the ticket is loaded into the smart card.

16. The method of claim 15 including concatenating the ticket information with the first hashed signal prior to generating the second hash by the ticket provider.

* * * * *